US011587313B2

(12) United States Patent
Kraus (10) Patent No.: US 11,587,313 B2
(45) Date of Patent: Feb. 21, 2023

(54) BALE IDENTIFICATION USING PHOTOGRAPHIC IMAGE OF TWINE PATTERN

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

(*) Notice: Subject to any disclaimer, the term of this patent is extended or adjusted under 35 U.S.C. 154(b) by 260 days.

(21) Appl. No.: 16/948,015

(22) Filed: Aug. 27, 2020

(65) Prior Publication Data

US 2022/0067371 A1 Mar. 3, 2022

(51) Int. Cl.
*G06T 7/90* (2017.01)
*G06V 20/10* (2022.01)
(Continued)

(52) U.S. Cl.
CPC ............ *G06V 20/188* (2022.01); *A01F 15/14* (2013.01); *G06T 7/90* (2017.01); *G06V 10/751* (2022.01);
(Continued)

(58) Field of Classification Search
CPC .. G06V 20/188; G06V 10/751; G06V 10/225; G06V 10/56; G06V 20/20; G06V 10/17; A01F 15/14; A01F 15/04; A01F 15/071; A01F 2015/0745; A01F 15/08; G06T 7/90; G06T 2207/10024; G06T 2207/30188
(Continued)

(56) References Cited

U.S. PATENT DOCUMENTS

2007/0175341 A1* 8/2007 Roberts ............... A01F 15/0816
100/102
2015/0354943 A1* 12/2015 Posselius ............. G01B 11/026
73/1.79
(Continued)

FOREIGN PATENT DOCUMENTS

EP         3228180 A1      10/2017
WO    WO-2006027637 A1 *  3/2006 ......... A01F 15/0715
WO      WO2006027637 A1    3/2006

OTHER PUBLICATIONS

Extended European Search Report and Written Opinion issued in European Patent Application No. 21192690.2, dated Jan. 26, 2022, in 11 pages.

*Primary Examiner* — Ali Bayat (57) ABSTRACT

A method of identifying a bale of material includes capturing an initial image of a region of an initial bale with an initial image sensor and identifying a unique band pattern of at least one multi-colored band of the initial bale. The identified unique band pattern is associated with the initial bale. Data related to the initial bale is associated with the identified unique band pattern. The identified unique band pattern of the initial bale may then be used as an identifier of the initial bale. A second image of the bale is captured and analyzed to determine if the second image includes the unique band pattern of the at least one multi-colored band, thereby identifying the bale in the second image as the initial bale. The data associated with the initial bale may then be retrieved by an operator.

23 Claims, 3 Drawing Sheets

(51) Int. Cl.
  *G06V 10/75* (2022.01)
  *A01F 15/14* (2006.01)
  *A01F 15/04* (2006.01)
  *A01F 15/07* (2006.01)

(52) U.S. Cl.
  CPC ............ *A01F 15/04* (2013.01); *A01F 15/071* (2013.01); *A01F 2015/0745* (2013.01); *G06T 2207/10024* (2013.01); *G06T 2207/30188* (2013.01)

(58) Field of Classification Search
  USPC ........................................................ 382/103
  See application file for complete search history.

(56) References Cited

U.S. PATENT DOCUMENTS

| | | | | |
|---|---|---|---|---|
| 2018/0021796 A1* | 1/2018 | Roberts | ................ | G01N 33/02 427/427.2 |
| 2019/0302772 A1* | 10/2019 | Anderson | ............... | B60L 53/66 |
| 2021/0240965 A1* | 8/2021 | Yadav | ................ | G08G 5/0013 |

* cited by examiner

BALE IDENTIFICATION USING PHOTOGRAPHIC IMAGE OF TWINE PATTERN

TECHNICAL FIELD

The disclosure generally relates to a system and method for identifying and tracking a bale of material.

BACKGROUND

Many different materials may be formed into a bale for transportation and/or storage. The material may include, but is not limited to, forage material such as hay, alfalfa, corn stalks, etc.; cotton; paper; etc. The bales may be formed to include, but are not limited to, a parallelepiped shape or a cylindrical shape. Bales having a parallelepiped shape are generally formed by compressing the material into a flake within a rectangular compression chamber, and then bundling multiple flakes together to form the bale. Bales having a cylindrical shape are generally formed by continuously feeding the crop material into a cylindrical forming chamber and rolling the crop material in a spiral fashion into the bale having the cylindrical shape.

The material forming each respective bale may have different and unique characteristics that an operator may wish to track and/or monitor. For example, each bale may have a respective weight, moisture content, ash content, variety of material content, weed content, nutritional content, etc. In some operations, it is useful for the operator to be able to track and identify the characteristics for each individual bale. By doing so, for example, the operator may separate bales of higher quality from bales of lower quality, and sell/use them accordingly.

Previously, it is known to attach an RFID tag to each bale, and assign the RFID tag a specific identification number. Specific characteristics of the bale with then be associated with the specific identification number. The RFID tag may be read/scanned to identify the identification number, and then the associated characteristics of that bale may be retrieved.

SUMMARY

A method of identifying a bale of material bound together by at least one multi-colored band is provided. The method includes capturing an initial image of a region of an initial bale with an initial image sensor. A computing device identifies a unique band pattern of the at least one multi-colored band of the initial bale from the initial image. The identified unique band pattern is associated with the initial bale by the computing device. The captured initial image of the initial bale and the identified unique band pattern associated with the initial bale are then saved in a memory of the computing device. The identified unique band pattern of the initial bale may be used as an identifier of the initial bale.

In one aspect of the disclosure, data related to the initial bale may be associated with the identified unique band pattern. The data may include, but is not limited to, information such as nutrient content of the crop material, field location from which the crop material was harvested, type of crop material, area of the field from which the crop material was harvested, date of bale formation, weight of the bale, moisture content of the bale, ash content of the bale, etc.

In one aspect of the disclosure, a second image of a second region of a second bale having a second indicia indicating the second region is captured with a second image sensor. The second image sensor may include, but is not limited to, a handheld device, such as a smart phone, tablet, etc. The second image may then be communicated to the computing device and saved in the memory of the computing device.

In one aspect of the disclosure, the computing device may compare the second image of the second bale to the unique band pattern identified in the initial image of the initial bale. The computing device makes this comparison to determine if the second image of the second bale includes the unique band pattern identified in the initial image. If the computing device identifies the unique band pattern in the second image of the second bale, then the computing device may determine that the second bale from the second image is the initial bale from the initial image. When the unique band pattern is identified in the second image of the second bale, the computing device may then communicate the data related to the initial bale and associated with the unique band pattern to an output. The output may include, but is not limited to, a display screen or audio speaker of a portable handheld device, or other remotely located computer.

In one aspect of the disclosure, the initial bale is marked with indicia indicating the region of the initial bale captured by the initial image. In one implementation, the indicia may include a knot in the at least one multi-colored band. In another implementation, the at least one multi-colored band may include a plurality of multi-colored bands with the indicia disposed on a pre-defined one of the multi-colored bands. The pre-defined one of the multi-colored bands including the indicia may be defined as a location identification band that has a color scheme distinct from the other of the plurality of multi-colored bands. It should be appreciated that the region of the initial bale may be marked in some other manner, such as with a tag, a specifically colored section of the location identification band, etc.

In one aspect of the disclosure, the method described herein includes securing the bale of material in a package forming the bale with the at least one multi-colored band. In one implementation, the at least one multi-colored band includes a plurality of multi-colored bands. The plurality of multi-colored bands includes only one location identification band having a first color scheme. The remainder of the plurality of multi-colored bands include at least one pattern identification band having a second color scheme. The second color scheme is different from the first color scheme.

A bale identification system is also provided. The bale identification system includes an initial image sensor that is operable to capture an initial image, and a computing device disposed in communication with the initial image sensor. The computing device is operable to receive the initial image from the initial image sensor, and includes a processor and a memory having a bale identification algorithm stored thereon. The processor is operable to execute the bale identification algorithm to analyze the initial image to identify a unique band pattern of at least one multi-colored band of an initial bale in the initial image. The computing device may then associate the unique band pattern with the initial bale, and save the initial image and the associated unique band pattern in the memory of the computing device. The identified unique band pattern of the initial bale may then be used as an identifier of the initial bale.

In one aspect of the disclosure, the processor is operable to execute the bale identification algorithm to associate data related to the initial bale with the identified unique band pattern of the initial bale. The data may include, but is not limited to, information such as nutrient content of the crop material, field location from which the crop material was harvested, type of crop material, area of the field from which the crop material was harvested, date of bale formation, weight of the bale, moisture content of the bale, ash content of the bale, etc.

In one aspect of the disclosure, the bale identification system includes a second image sensor. The second image sensor is operable to capture a second image of a second bale. The second image sensor is disposed in communication with the computing device for communicating the second image to the computing device. In one implementation, the second image sensor may include, but is not limited to, a handheld device, such as a smart phone or a tablet.

In one aspect of the disclosure, the processor is operable to execute the bale identification algorithm to compare the second image of the second bale to the unique band pattern identified in the initial image of the initial bale. The computing device makes this comparison to determine if the second image of the second bale includes the unique band pattern identified in the initial image. When unique band pattern is identified in the second image of the second bale, the computing device of the bale identification system may determine that the second bale from the second image is the initial bale from the initial image.

In one aspect of the disclosure, the bale identification system includes an output disposed in communication with the computing device. The output is operable to receive a signal from the computing device. When the unique band pattern is identified in the second image of the second bale, the processor is operable to execute the bale identification algorithm to communicate data related to the initial bale and associated with the unique band pattern to the output. In one implementation, the output may include, but is not limited to, a touch screen display of a portable hand held device, such as but not limited to a smart phone or tablet.

In one aspect of the disclosure, the bale identification system may include a marker that is operable to affix indicia to the initial bale indicating the region of the initial bale captured by the initial image. In one implementation, the marker may include, but is not limited to, a banding system that ties a knot in the at least one multi-colored band. In one implementation, the at least one multi-colored band includes a plurality of multi-colored bands. One of the plurality of multi-colored bands may be defined as a location identification band. The knot in the location identification band may be defined as the indicia indicating the region of the initial bale.

In one aspect of the disclosure, the initial image sensor and the marker are disposed on a baler implement. The marker is operable to affix the indicia on the initial bale during formation of the initial bale. The initial image sensor is operable to capture the initial image of the initial bale upon completion of formation of the initial bale.

In one aspect of the disclosure, the baler implement includes a banding system that is operable to bind the bale of material with each of the plurality of multi-colored bands. The plurality of multi-colored bands includes only one location identification band having a first color scheme. The remainder of the plurality of multi-colored bands include at least one pattern identification band having a second color scheme. The second color scheme is different from the first color scheme. In one implementation, the second color scheme includes each of the pattern identification bands formed from twine having multiple color segments of variable length arranged in an alternating relationship. The position of the alternating colors of the multiple pattern identification bands form the unique band pattern, which is unique to each bale.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
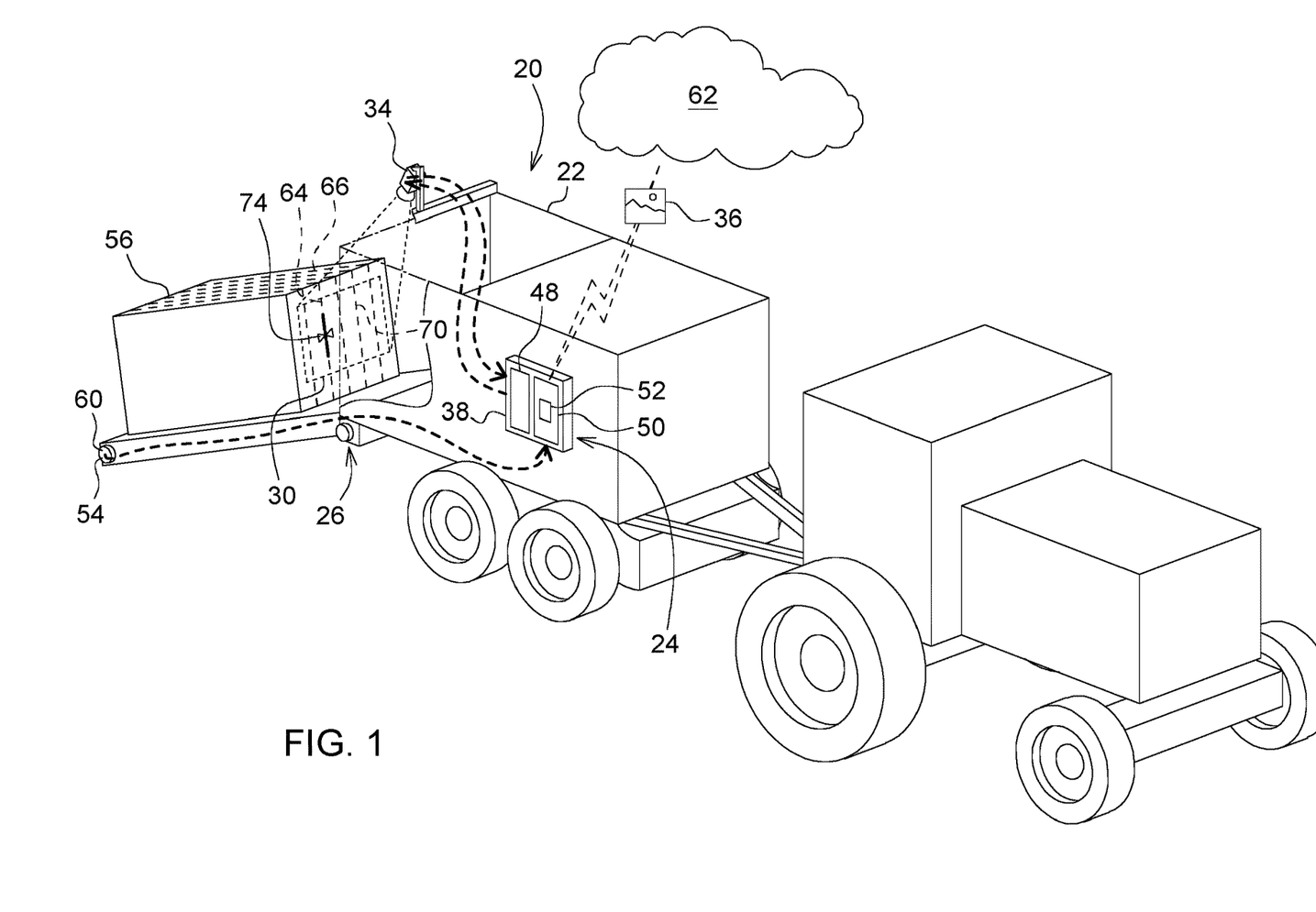
FIG. 1 is a schematic perspective view of a baler implement forming an initial bale.

Referring to the Figures, wherein like numerals indicate like parts throughout the several views, a baler implement is generally shown at 20 in FIG. 1. Referring to FIG. 1, the baler implement 20 forms crop material into an initial bale 56. The example implementation of the baler implement 20 is shown as a large square baler that forms the crop material into a bale having a parallelepiped shape. However, it should be appreciated that the teachings of this disclosure may be applied to other types and/or configurations of baler, such as but not limited to, a round baler that forms the crop material into a bale having a cylindrical shape.

The baler implement 20 includes a bale formation system 22 for forming collected crop material into the bale. The specific features, components, and operation of the bale formation system 22 are dependent upon the type of baler implement 20. For example, if the baler implement 20 is configured as a large square baler, such as the example implementation shown in the figures and described herein, then the bale formation system 22 may include a pick-up that gathers the crop material and a feeder system that feeds the crop material into a compression chamber. A crank arm is connected to an output of a transmission. A connecting link interconnects the crank arm and a plunger. The crank arm rotates based upon the output of the transmission and the plunger moves in a reciprocal motion within the compression chamber as the crank arm rotates. The plunger extends into the compression chamber, thereby compressing the crop material, and then at least partially retracts from the compression chamber to allow the feeder system to move more crop material into the compression chamber. The general features and operation of the bale formation system 22 of the large square baler are understood by those skilled in the art, are not pertinent to the teachings of this disclosure, and are therefore not described in greater detail herein.

If the baler implement 20 is configured as a round baler, then the bale formation system 22 may be configured as a variable chamber baler, or as a fixed chamber baler. When configured as a variable chamber baler the bale formation system 22 includes a plurality of longitudinally extending side-by-side forming belts that are supported by a plurality of rollers. The bale is formed by the forming belts and one or more side walls of a housing. The crop material is directed through an inlet and into a baling chamber, whereby the forming belts roll the crop material in a spiral fashion into the bale to form a cylindrical shape. The belts apply a constant pressure to the crop material as the crop material is formed into the bale. A belt tensioner continuously moves the forming belts radially outward relative to a center of the cylindrical bale as the diameter of the bale increases. The belt tensioner maintains the appropriate tension in the belts to obtain the desired density of the crop material. When configured as a fixed chamber baler, the bale formation system 22 includes a plurality of rollers fixed in position to define a circular forming chamber. The crop material is directed through an inlet and into the forming chamber, whereby at least one of the rollers rotates to rotate the crop material in a spiral fashion, thereby forming the bale into the cylindrical shape. The general features and operation of the bale formation system 22 of the variable chamber round baler and the fixed chamber round baler are understood by those skilled in the art, are not pertinent to the teachings of this disclosure, and are therefore not described in greater detail herein.

The baler implement 20 further includes a banding system 64. The banding system 64 is operable to bind the bale of material with at least one multi-colored band. The multi-colored band may include a twine or a plastic strap, as is understood by those skilled in the art. The features, components, and operation of the banding system 64 are dependent upon the type and configuration of the bale formation system 22, are well known to those skilled in the art, and are therefore not described in detail herein.

In one implementation, the at least one multi-colored band 66 includes a single band having a first color scheme 68. The first color scheme 68 defines a unique band pattern 76, which may be used to identify a bale 56, 58. The single multi-colored band 66 may be formed from a plurality of differently colored strands wound together to form a distinct, non-uniform and non-repeating pattern, i.e., a random pattern. The random pattern formed by the plurality of multi-colored strands of the multi-colored band 66 defines the first color scheme 68, which is unique to each respective bale. This random strand pattern may be defined as the unique band pattern 76 and used to identify that bale.

In another implementation, the at least one multi-colored band includes a plurality of multi-colored bands having a single, i.e., only one, location identification band 66 having a first color scheme 68. The remainder of the multi-colored bands includes at least one pattern identification band 70 having a second color scheme 72. The second color scheme 72 is different from the first color scheme 68. In one implementation, all of the remainder of the multi-colored bands, i.e., all of the multi-colored bands other than the location identification band 66, are configured as pattern identification bands 70. In other embodiments, only a portion of the remainder of the multi-colored bands may be configured as pattern identification bands 70. In such configurations, the plurality of multi-colored bands would include one location identification band 66, at least one pattern identification band 70, and at least one standard band (not shown in the example implementation). In one implementation, the at least one pattern identification band 70 includes at least two or more pattern identification bands 70.

The first color scheme 68 of the location identification band 66 includes a color or sequence of colors that is unique to the location identification band 66. Additionally, the location identification band 66 includes an indicia 28 indicating a specific region 30 or location of the initial bale 56. The indicia 28 may include, but is not limited to, a knot 74 in the location identification band 66, a clamp in the location identification band 66, a specific color segment in the location identification band 66, a tag attached to the location identification band 66, etc. It should be appreciated that the first color scheme 68 may be configured differently than described herein. The location identification band 66 is unique from all of the other bands in order to identify the specific region 30 and/or orientation of the bale. For example, the location identification band 66 may be arranged such that when positioned on the left-most side of the initial bale 56, the location identification band 66 identifies a specific face of the initial bale 56 and/or a specific region 30 of the initial bale 56. It should be appreciated that the manner or location at which the location identification band 66 is positioned on the initial bale 56 may differ from the above example, but is consistent for each bale bound by the banding system 64.

The second color scheme 72 of the pattern identification bands 70 may include any combination or sequence of two or more colors and/or patterns. The sequence may be a uniform sequence, i.e., a sequence of two colors each having a defined segment length, or may be a random sequence having more than two colors arranged in a random sequence, and/or with each color segment having a random segment length. It should be appreciated that the second color scheme 72 may be configured differently than described herein.

The second color scheme 72 is operable to form a band pattern that is unique to each bale. The band pattern is the pattern of colors and patterns formed by the pattern identification bands 70 in the region 30 of the initial bale 36 identified by the location identification band 66. Accordingly, it should be appreciated that the more variation in the second color scheme 72, i.e., the more complex the second color scheme 72 of each of the pattern identification bands 70, the more unique the band pattern will be. Additionally, a higher amount of variation in the second color scheme 72 may require fewer pattern identification bands 70 to form the band pattern. For example, a unique band pattern may be formed by a single pattern identification band 70 if the second color scheme 72 is entirely random and none repeating. However, a simple second color scheme 72 formed from two different colors may require several pattern identification bands 70 to provide a band pattern that is unique to each respective bale.

The baler implement 20 may further include a bale identification system 24. The bale identification system 24 provides features and components that enable a method of identifying and tracking each respective bale and information related to each respective bale.

The bale identification system 24 may include a marker 26 disposed on the baler implement 20. The marker 26 is operable to affix the indicia 28 onto the bale during formation of the bale in the bale formation system 22. The indicia 28 identifies the region 30 of the bale from which the band pattern is identified. The indicia 28 may include a feature that is attached to the bale and is capable of identifying the region 30 of the bale. In the example implementation described herein, the marker 26 may include the banding system 64, and the indicia 28 may include the knot 74 formed in the location identification band 66. In other implementations, the indicia 28 may include, but is not limited to, a specialized twin or bale wrap having a flag or colored portion that is placed on the bale at or near the region 30 of the bale. As is understood by those skilled in the art, the bale is bound together with a twine or bale wrap. A color or flag may be added to the twine or bale wrap, with the colored portion or flag positioned on the bale to indicate the region 30 of the bale. Alternatively, a tag may be attached to the bale, such as with fastener or an adhesive, indicating the region 30 of the bale. It should be appreciated that the marker 26 may be implemented in a number of different manners that are not specifically described herein and may include any system that is capable of indicating the region 30 of the associated bale to which it is attached.

In the implementation shown in the figures and described herein, the indicia 28 includes the knot 74 in the location identification band 66 that is formed in twine used to bind the bale. The twine is wrapped around the bale during formation of the initial bale 56. The twine is tied in the knot 74 by a knot 74*ter* system (not shown). The knot 74 in the location identification band 66 is the indicia 28 that may be used to identify the specific region 30 or location of the initial bale 56.

The baler identification system may further include an initial image sensor 34 positioned on the baler implement 20 to capture an initial image 36 of the region 30 of the bale. The initial image sensor 34 is disposed in communication with a computing device 38 (described in greater detail below) for communicating the initial image 36 of the bale to the computing device 38. The initial image sensor 34 is operable to capture the initial image 36 of the initial bale 56 upon completion of formation of the initial bale 56, or immediately thereafter. In other words, the initial image sensor 34 may capture the initial image 36 of the bale at or near the baler implement 20 as formation of the initial bale 56 is completed and/or discharged onto the ground. The initial image sensor 34 may include, for example, a camera or other image sensing device capable of sensing an image of the region 30 of the bale. The specific type, configuration, and operation of the initial image sensor 34 are understood by those skilled in the art, are not pertinent to the teachings of the disclosure, and are therefore not described in detail herein.

Figure 2:
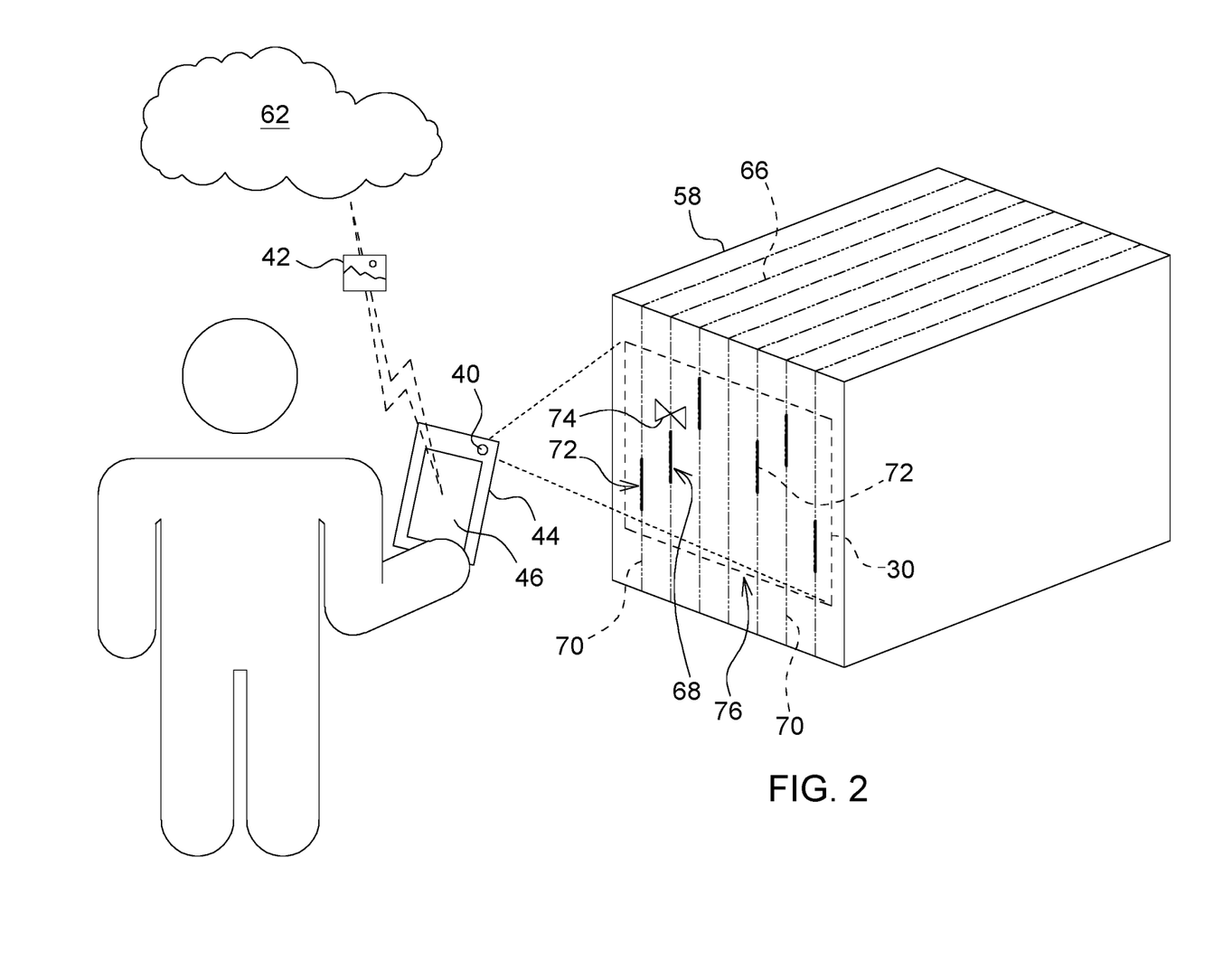
FIG. 2 is a schematic perspective view of an operator capturing a second image of a second bale.

Referring to FIG. 2, the bale identification system 24 may further include a second image sensor 40 that is operable to capture a second image 42 of a bale. The second image sensor 40 4 is disposed in communication with the computing device 38 for communicating the second image 42 to the computing device 38. The second image sensor 40 may include, for example, a camera or other image sensing device capable of sensing an image of the region 30 of the bale. In one implementation, the second image sensor 40 may include a camera of a handheld device, such as but not limited to a smart phone 44 or tablet. The second image sensor 40 may be located remotely from the initial image sensor 34. As noted above, the second image sensor 40 may be incorporated into a handheld device. In other implementations, the second image sensor 40 may be mounted onto a second vehicle, remote from the baler implement 20.

The bale identification system 24 may further include an output 46. The output 46 is disposed in communication with the computing device 38 and operable to receive a signal from the computing device 38. The output 46 may include any device that is capable of communicating information or a message to an operator. For example, the output 46 may include a visual display and/or an audio speaker. In one implementation, the output 46 is a handheld device, such as but not limited to a smart phone 44 or tablet. In one implementation, the second image sensor 40 and the output 46 are combined as a single device. In other implementations, the output 46 may be mounted onto a vehicle, remote from the baler implement 20.

As described above, the bale identification system 24 includes the computing device 38. The computing device 38 is disposed in communication with the initial image sensor 34, the second image sensor 40, and the output 46. The computing device 38 is operable to receive image signals from the initial image sensor 34, receive image signals from the second image sensor 40, and communicate a signal to the output 46. While the computing device 38 is generally described herein as a singular device, it should be appreciated that the computing device 38 may include multiple devices linked together to share and/or communicate information therebetween. Furthermore, it should be appreciated that the computing device 38 may be located on the baler implement 20 or located remotely from the baler implement 20.

The computing device 38 may alternatively be referred to as a computer, a controller, a control unit, a control module, a module, etc. The computing device 38 includes a processor 48, a memory 50, and all software, hardware, algorithms, connections, sensors, etc., necessary to manage and control the operation of the initial image sensor 34, the second image sensor 40, and the output 46. As such, a method may be embodied as a program or algorithm operable on the computing device 38. It should be appreciated that the computing device 38 may include any device capable of analyzing data from various sensors, comparing data, making decisions, and executing the required tasks.

As used herein, "computing device 38" is intended to be used consistent with how the term is used by a person of skill in the art, and refers to a computing component with processing, memory, and communication capabilities, which is utilized to execute instructions (i.e., stored on the memory 50 or received via the communication capabilities) to control or communicate with one or more other components. In certain embodiments, the computing device 38 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The computing device 38 may be in communication with other components on the baler implement 20, such as hydraulic components, electrical components, and operator inputs within an operator station of an associated work vehicle. The computing device 38 may be electrically connected to these other components by a wiring harness such that messages, commands, and electrical power may be transmitted between the computing device 38 and the other components. Although the computing device 38 is referenced in the singular, in alternative embodiments the configuration and functionality described herein can be split across multiple devices using techniques known to a person of ordinary skill in the art.

The computing device 38 may be embodied as one or multiple digital computers or host machines each having one or more processors 48, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 50 may include any non-transitory/tangible medium which participates in providing data or computer-readable instructions. The memory 50 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The computing device 38 includes the tangible, non-transitory memory 50 on which are recorded computer-executable instructions, including an identification algorithm 52. The processor 48 of the computing device 38 is configured for executing the identification algorithm 52. The identification algorithm 52 implements a method of identifying a bale of material, described in detail below.

Figure 3:
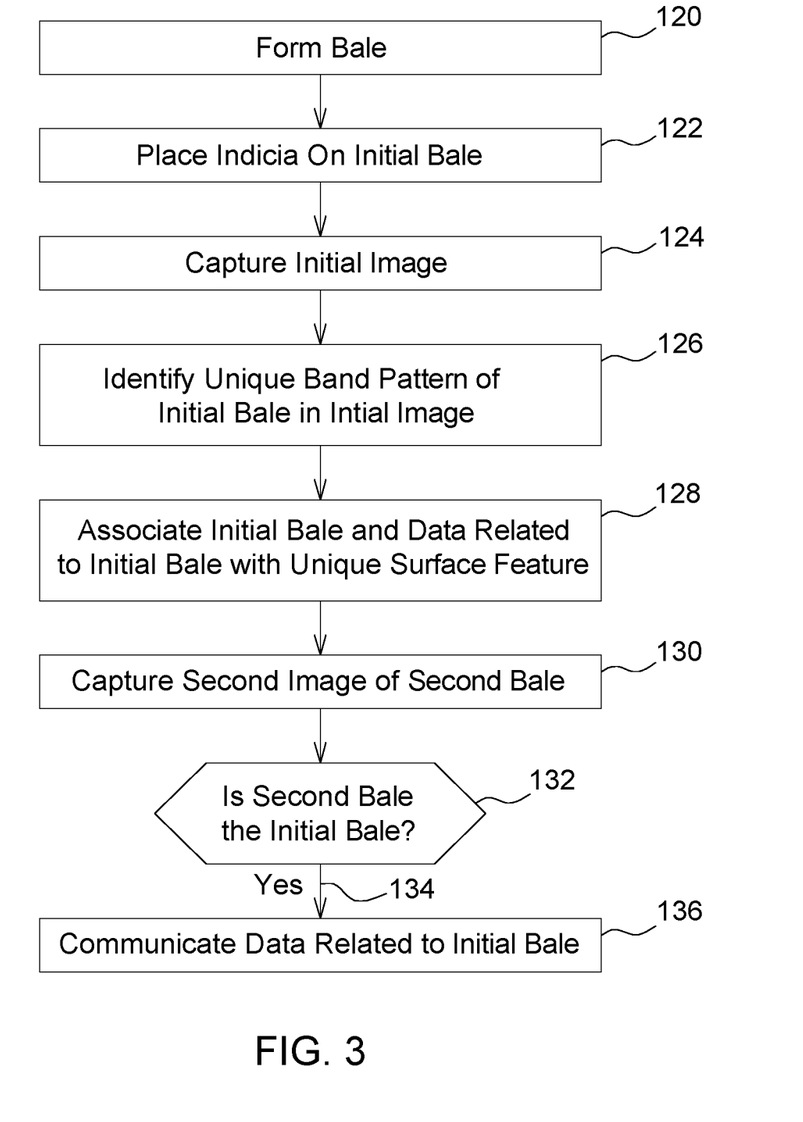
FIG. 3 is a flowchart representing a method of identifying a bale of material.

Referring to FIG. 3, the method of identifying a bale includes forming the initial bale 56 within the bale formation system 22 of the baler implement 20. The step of forming the initial bale 56 is generally indicated by box 120 in FIG. 3. The specific manner and/or configuration in which the initial bale 56 is formed is not pertinent to the teachings of this disclosure. However, example implementations of the bale formation system 22 are described above.

After the initial bale 56 is formed, the initial bale 56 is secured in the shape of the bale with the at least one multi-colored band. In one implementation, the initial bale 56 is secured with only a single multi-colored band 66. In another implementation, the initial bale 56 is secured with a plurality of multi-colored bands 66, 70. As described above, the plurality of multi-colored bands includes only one location identification band 66 having a first color scheme 68. At least one of the remainder of the multi-colored bands include a pattern identification band 70 having a second color scheme 72 that is different from the first color scheme 68. In one implementation, all of the remaining multi-colored bands are configured as pattern identification bands 70 having the second color scheme 72.

During formation of the initial bale 56, the marker 26 affixes the indicia 28 onto the initial bale 56. The step of placing the indicia 28 on the initial bale 56 is generally indicated by box 122 in FIG. 3. The indicia 28 indicates a specific region 30 of the initial bale 56. As noted above, the indicia 28 may include a feature that is capable of identifying the region 30 of the initial bale 56. In the example implementation described herein, the indicia 28 includes the knot 74 in the location identification band 66.

A trigger 54 may indicate when formation of the initial bale 56 is complete. The trigger 54 may actuate or signal to the computing device 38 to actuate the initial image sensor 34 to capture the initial image 36. The trigger 54 may include a component or feature of the baler implement 20 that is actuated or engaged at or near the end of formation of the initial bale 56, or at the beginning of formation of a subsequent bale. Using the trigger 54 as a signal to actuate the initial image sensor 34 ensures that the initial image 36 is captured at the appropriate time or stage of the bale formation sequence. For example, the trigger 54 may include, but is not limited to, engagement of a knot 74*ter* system, operation of a star wheel, movement of a discharge roller 60, etc. The trigger 54 may be disposed in communication with the computing device 38 to communicate a signal to the computing device 38, or may otherwise include a sensor to sense actuation of the trigger 54, with the sensor communicating the signal to the computing device 38. Upon receiving the signal from the trigger 54, the computing device 38 may actuate the initial image sensor 34 to capture the initial image 36.

An initial image 36 of the region 30 of the initial bale 56 is then captured with the initial image sensor 34. The step of capturing the initial image 36 is generally indicated by box 124 in FIG. 3. The initial image 36 is communicated to the computing device 38. In the example implementation described herein, the computing device 38 is connected to the initial image sensor 34 through the Cloud 62 or other wireless network connection. As such, the initial image sensor 34 communicates the initial image 36 through the Cloud 62 to the computing device 38.

The computing device 38 then analyzes the initial image 36 to identify at least one unique band pattern of the initial bale 56 in the initial image 36. The step of identifying the unique band pattern is generally indicated by box 126 in FIG. 3. As described above, the unique band pattern may include, but is not limited to, a specific position, orientation, relationship, or distance relative to or between other pattern identification bands 70, a specific color sequence, color orientation, or color segment relationship relative to or between other pattern identification bands 70 and/or a specific color segment sequence, orientation, or length of color segments relative to other pattern identification bands 70 and/or on individual pattern identification bands 70, etc. The computing device 38 may use object recognition software, neural networks, artificial intelligence, or other similar image analysis tools known to those skilled in the art to identify the unique band pattern.

Once the computer device has identified the unique band pattern of the initial bale 56 from the initial image 36, the unique band pattern is associated with the initial bale 56. The initial image 36 and the associated unique band pattern may then be saved in the memory 50 of the computing device 38, such that the identified unique band pattern of the initial bale 56 is used as an identifier of the initial bale 56.

Data related to the initial bale 56 is also associated with the identified unique band pattern and/or the initial bale 56, and saved in the memory 50 of the computing device 38. The step of associating the initial bale 56 and the data related to the initial bale 56 with the unique band pattern is generally indicated by box 128 in FIG. 3. The data may be communicated to the computing device 38 with the initial image 36 of the bale. The data may be detected, sensed, calculated, or otherwise determined by the baler implement 20, an associated vehicle such as but not limited to a tractor, or by some other device disposed in communication with the baler implement 20. The data associated with the initial bale 56 may include, but is not limited to, nutrient content, field location, crop/material type, area of field from which the crop material was harvested, date of bale formation, bale weight, moisture content, ash content, etc.

A second image 42 of a second region 30 of a second bale 58 may be captured with the second image sensor 40. The step of capturing the second image 42 is generally indicated by box 130 in FIG. 3. The second bale 58 may include a second indicia 28 indicating the second region 30 of the second bale 58, such that the second region 30 may be identified. The second image 42 is communicated to the computing device 38. In the example implementation described herein, the computing device 38 is connected to the second image sensor 40 through the Cloud 62 or other wireless network connection. As such, the second image sensor 40 communicates the second image 42 through the Cloud 62 to the computing device 38.

The computing device 38 may then compare the second image 42 of the second bale 58 to the unique band pattern identified in the initial image 36 of the initial bale 56. The computing device 38 makes this comparison to determine if the second image 42 of the second bale 58 includes the unique band pattern identified in the initial image 36, or if the second image 42 of the second bale 58 does not include the unique band pattern identified in the initial image 36. The step of determining if the second bale 58 is the same as the initial bale 56 is generally indicated by box 132 in FIG. 3. When unique band pattern is identified in the second image 42 of the second bale 58, the computing device 38 3 may determine that the second bale 58 from the second image 42 is the initial bale 56 from the initial image 36, generally indicated at 134. In other words, the computing device 38 uses the unique band pattern associated with the initial bale 56 to identify the second bale 58 as the initial bale 56 at a later time. Assuming that the second bale 58 is in fact the initial bale 56, the indicia 28 indicates the region 30 of the bale from which the initial image 36 was captured. By so doing, the second image 42 may capture the same region 30 of the second bale 58, thereby ensuring that the unique band pattern identified in the initial image 36 will be present in the second image 42.

In contrast, when the unique band pattern is not identified in the second image 42 of the second bale 58, the computing device 38 may determine that the second bale 58 from the second image 42 is not the initial bale 56 from the initial image 36. Assuming that multiple bales have been previously identified and associated with respective unique band patterns, the computing device 38 may compare the second image 42 to each of the images associated with other bales in order to determine if the second image 42 includes the unique band pattern of one of the other previously catalogued bales.

When the computing device 38 determines that the second bale 58 is the initial bale 56, i.e., that the second image 42 included the unique band pattern identified in the initial image 36 and associated with the initial bale 56, then the computing device 38 may communicate the data related to and associated with the initial bale 56 to the output 46. The step of communicating the data related to the initial bale 56 is generally indicated by box 136 in FIG. 3. In practice, an operator may capture the second image 42 of the second bale 58 using the second image sensor 40, e.g., the operator's smart phone 44. If the computing device 38 determines that the second image 42 includes the unique band pattern of the initial bale 56, and determines that the second bale 58 is the initial bale 56, then the computing device 38 may communicate the data related to the initial bale 56 to the output 46, e.g., the operator's smart phone 44. The operator may then make decisions related to the use, transport, placement of that respective bale knowing the pertinent data related to it.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of identifying a bale of material bound together by at least one multi-colored band, the method comprising:
    capturing an initial image of a region of an initial bale with an initial image sensor;
    identifying a unique band pattern of the at least one multi-colored band of the initial bale from the initial image with a computing device;
    associating the identified unique band pattern with the initial bale with the computing device;
    saving the captured initial image of the initial bale and the identified unique band pattern associated with the initial bale in a memory of the computing device, such that the identified unique band pattern of the initial bale is used as an identifier of the initial bale; and
    wherein the at least one multi-colored band includes a plurality of multi-colored bands including only one location identification band having a first color scheme, and wherein the remainder of the plurality of multi-colored bands include at least one pattern identification band having a second color scheme that is distinct from the first color scheme.

2. The method set forth in claim 1, further comprising associating data related to the initial bale with the identified unique band pattern.

3. The method set forth in claim 2, further comprising capturing a second image of a second region of a second bale having a second indicia indicating the second region with a second image sensor.

4. The method set forth in claim 3, further comprising comparing the second image of the second bale to the unique band pattern identified in the initial image of the initial bale with the computing device to determine if the second image of the second bale includes the unique band pattern identified in the initial image.

5. The method set forth in claim 4, further comprising determining, with the computing device, that the second bale from the second image is the initial bale from the initial image when unique band pattern is identified in the second image of the second bale.

6. The method set forth in claim 5, further comprising communicating the data related to the initial bale associated with the unique band pattern to an output when the unique band pattern is identified in the second image of the second bale.

7. The method set forth in claim 1, further comprising marking the initial bale with indicia indicating the region of the initial bale captured by the initial image.

8. The method set forth in claim 1, further comprising securing the bale of material in a package with the at least one multi-colored band.

9. A method of identifying a bale of material bound together by at least one multi-colored band, the method comprising:
- capturing an initial image of a region of an initial bale with an initial image sensor;
- identifying a unique band pattern of the at least one multi-colored band of the initial bale from the initial image with a computing device;
- associating the identified unique band pattern with the initial bale with the computing device;
- saving the captured initial image of the initial bale and the identified unique band pattern associated with the initial bale in a memory of the computing device, such that the identified unique band pattern of the initial bale is used as an identifier of the initial bale;
- marking the initial bale with indicia indicating the region of the initial bale captured by the initial image; and
- wherein the indicia includes a knot in the at least one multi-colored band.

10. A bale identification system comprising:
- an initial image sensor operable to capture an initial image;
- a computing device in communication with the initial image sensor and operable to receive the initial image from the initial image sensor, wherein the computing device includes a processor and a memory having a bale identification algorithm stored thereon, wherein the processor is operable to execute the bale identification algorithm to:
- analyze the initial image to identify a unique band pattern of at least one multi-colored band of an initial bale in the initial image;
- associate the unique band pattern with the initial bale;
- save the initial image and the associated unique band pattern in the memory of the computing device, such that the identified unique band pattern of the initial bale is used as an identifier of the initial bale; and
- a second image sensor operable to capture a second image of a second bale, wherein the second image sensor is disposed in communication with the computing device for communicating the second image to the computing device.

11. The bale identification system set forth in claim 10, wherein the processor is operable to execute the bale identification algorithm to associate data related to the initial bale with the identified unique band pattern of the initial bale.

12. The bale identification system set forth in claim 10, wherein the second image sensor is a handheld device.

13. The bale identification system set forth in claim 10, wherein the processor is operable to execute the bale identification algorithm to compare the second image of the second bale to the unique band pattern identified in the initial image of the initial bale to determine if the second image of the second bale includes the unique band pattern identified in the initial image.

14. The bale identification system set forth in claim 13, wherein the processor is operable to execute the bale identification algorithm to determine that the second bale from the second image is the initial bale from the initial image when unique band pattern is identified in the second image of the second bale.

15. The bale identification system set forth in claim 13, further comprising an output disposed in communication with the computing device and operable to receive a signal from the computing device, wherein the processor is operable to execute the bale identification algorithm to communicate data related to the initial bale associated with the unique band pattern to the output when the unique band pattern is identified in the second image of the second bale.

16. The bale identification system set forth in claim 10, further comprising a marker operable to affix indicia to the initial bale indicating the region of the initial bale captured by the initial image.

17. A bale identification system comprising:
- an initial image sensor operable to capture an initial image;
- a computing device in communication with the initial image sensor and operable to receive the initial image from the initial image sensor, wherein the computing device includes a processor and a memory having a bale identification algorithm stored thereon, wherein the processor is operable to execute the bale identification algorithm to:
- analyze the initial image to identify a unique band pattern of at least one multi-colored band of an initial bale in the initial image;
- associate the unique band pattern with the initial bale;
- save the initial image and the associated unique band pattern in the memory of the computing device, such that the identified unique band pattern of the initial bale is used as an identifier of the initial bale;
- a marker operable to affix indicia to the initial bale indicating the region of the initial bale captured by the initial image; and
- wherein the indicia includes a knot in the at least one multi-colored band.

18. The bale identification system set forth in claim 17, wherein the initial image sensor and the marker are disposed on a baler implement, and wherein the marker is operable to affix the indicia on the initial bale during formation of the initial bale, and wherein the initial image sensor is operable to capture the initial image of the initial bale upon completion of formation of the initial bale.

19. A bale identification system comprising:
- an initial image sensor operable to capture an initial image;
- a computing device in communication with the initial image sensor and operable to receive the initial image from the initial image sensor, wherein the computing device includes a processor and a memory having a bale identification algorithm stored thereon, wherein the processor is operable to execute the bale identification algorithm to:
- analyze the initial image to identify a unique band pattern of at least one multi-colored band of an initial bale in the initial image;
- associate the unique band pattern with the initial bale;
- save the initial image and the associated unique band pattern in the memory of the computing device, such that the identified unique band pattern of the initial bale is used as an identifier of the initial bale; and
- a banding system operable to bind the bale of material with the at least one multi-colored band, wherein the at least one multi-colored ban includes a plurality of multi-colored bands having only one location identification band having a first color scheme, and wherein the remainder of the plurality of multi-colored bands include at least one pattern identification band having a second color scheme that is different from the first color scheme.

20. A baler implement for baling crop material, the baler implement comprising:
- a bale formation system for forming collected crop material into an initial bale;
- a banding system operable to bind the initial bale of material with each of the plurality of multi-colored bands, wherein the plurality of multi-colored bands includes only one location identification band having a first color scheme and a marker indicating a region of the initial bale, and the remainder of the plurality of multi-colored bands include at least two pattern identification bands having a second color scheme that is different from the first color scheme;
- an initial image sensor positioned to capture an initial image of the region of the initial bale;
- a computing device disposed in communication with the initial image sensor and operable to receive the initial image of the region of the initial bale, wherein the computing device includes a processor and a memory having a bale identification algorithm stored thereon, wherein the processor is operable to execute the bale identification algorithm to:
- analyze the initial image to identify a unique band pattern of the plurality of multi-colored bands of the initial bale in the initial image;
- associate the unique band pattern with the initial bale;
- save the initial image and the associated unique band pattern in the memory of the computing device, such that the identified unique band pattern of the initial bale is used as an identifier of the initial bale;
- associate data related to the initial bale with the identified unique band pattern of the initial bale; and
- save the data associated with the initial bale in the memory of the computing device.

21. The baler implement set forth in claim 20, wherein the processor is operable to execute the bale identification algorithm to receive a second image of a second bale captured by a second image sensor and compare the second image of the second bale to the unique band pattern identified in the initial image of the initial bale to determine if the second image of the second bale includes the unique band pattern identified in the initial image, or if the second image of the second bale does not include the unique band pattern identified in the initial image.

22. The baler implement set forth in claim 21, wherein the processor is operable to execute the bale identification algorithm to determine that the second bale from the second image is the initial bale from the initial image when unique band pattern is identified in the second image of the second bale.

23. The baler implement set forth in claim 22, wherein the processor is operable to execute the bale identification algorithm to communicate that data associated with the initial bale to an output when the unique band pattern is identified in the second image of the second bale.

* * * * *